UNITED STATES PATENT OFFICE.

EDWARD R. STOWELL, OF PORTLAND, INDIANA.

COMPOSITION OF MATTER FOR USE IN THE FORMATION OF FIREPROOF AND INSULATING STRUCTURES.

1,382,329.     Specification of Letters Patent.     Patented June 21, 1921.

No Drawing.     Application filed November 5, 1919. Serial No. 335,811.

*To all whom it may concern:*

Be it known that I, EDWARD R. STOWELL, a citizen of the United States, residing at Portland, in the county of Jay and State of Indiana, have invented a new and useful Composition of Matter for Use in the Formation of Fireproof and Insulating Structures, of which the following is a specification.

This invention relates to a composition of matter for use in the formation of fireproof and insulating structures, one of its objects being to provide an inexpensive but efficient composition which can be poured and troweled like ordinary concrete or like plastic mixtures and which will quickly set and become hard and strong.

With the foregoing and other objects in view which will appear as the description proceeds, the invention consists of the following ingredients substantially in the proportions stated, to wit:

Sodium silicate, (32 degree,) 1 gallon.
Pumice, (powdered,) 4 to 6 pounds.
Sawdust or shavings sufficient to make a stiff mixture.

In preparing the composition the above ingredients are thoroughly mixed with cement, the preferred proportions being one part of cement to four or five parts of the mixture. The amount of water used depends on the manner in which the mixture is to be used. The composition should be thinned, if it is to be poured into molds, but can be left thick and workable, if it is to be troweled.

In practice the cement is added to the mixture just prior to the use thereof, said mixture being supplied to the trade with instructions to add the cement in proper proportions.

The sawdust is used in this composition because of its well known insulating properties and by using sodium silicate the sawdust is rendered fireproof and is caused properly to adhere and at the same time is rendered more efficient as an insulating medium. The Portland cement causes the product to set or harden rapidly, thus making the composition of practical value and it also serves to render the composition insoluble when exposed to moisture in any form. Fifty per cent. or more of sawdust is necessary to produce the desired consistency. By utilizing the pumice in connection with sodium silicate the binder thus produced will be light but of a porous nature and will not reduce the insulating qualities of the composition produced.

What is claimed is:—

1. A composition of matter for use in the formation of fireproof and insulating structures, consisting of a mixture of cement and a filler comprising sodium silicate, powdered pumice, and wood particles, the sodium silicate constituting means for filling the pores of the wood particles and binding them together.

2. A composition of matter to be mixed with Portland cement in the formation of fireproof and insulating structures, consisting of wood particles, and sodium silicate constituting means for filling the pores of the wood particles and for binding the particles together, the sodium silicate having a filler of powdered pumice forming a light body therefor.

In testimony that I claim the foregoing as my own, I have hereto affixed my signature in the presence of two witnesses.

EDWARD R. STOWELL.

Witnesses:
AUBREY L. STOWELL,
OLLIE E. STOWELL.